United States Patent [19]

Reunamaki

[11] Patent Number: 5,337,393
[45] Date of Patent: Aug. 9, 1994

[54] METHOD FOR HEATING A FLAT GLASS SHEET

[75] Inventor: Pauli T. Reunamaki, Perrysburg

[73] Assignee: Glasstech, Inc., Perrysburg, Ohio

[21] Appl. No.: 131,432

[22] Filed: Oct. 4, 1993

Related U.S. Application Data

[63] Continuation of Ser. No. 942,376, Sep. 9, 1992, abandoned, which is a continuation of Ser. No. 621,027, Nov. 30, 1990, abandoned.

[51] Int. Cl.⁵ .................. C03B 29/04; F26B 19/00
[52] U.S. Cl. .................. 392/417; 219/388; 65/162; 65/118; 432/8; 432/31
[58] Field of Search .................. 392/417, 411–415; 219/388, 508; 34/4, 40–41, 1 W, 48, 203; 65/118, 162, 95, DIG. 4; 432/8, 12, 31, 121, 145–148, 202

[56] References Cited

U.S. PATENT DOCUMENTS

| | | | |
|---|---|---|---|
| 1,571,282 | 2/1926 | Leculier | 34/41 |
| 2,629,162 | 2/1953 | Peck | 34/41 |
| 3,040,807 | 6/1962 | Chope | 34/48 |
| 3,508,899 | 4/1970 | Ward | 65/162 |
| 3,511,627 | 5/1970 | Flori . | |
| 3,744,985 | 7/1973 | Peternel | 65/162 |
| 4,119,426 | 10/1978 | Kelly | 65/104 |
| 4,202,112 | 5/1980 | von der Eltz et al. | 34/4 |
| 4,601,743 | 7/1986 | Canfield | 65/162 |
| 4,712,086 | 12/1987 | Reunamaki et al. | 219/546 |
| 4,807,144 | 2/1989 | Joehlin et al. | 364/477 |
| 4,824,464 | 4/1989 | Perin et al. | 65/118 |
| 4,981,434 | 1/1991 | Arndt | 34/41 |
| 5,122,180 | 6/1992 | Mathivat et al. | 65/162 |
| 5,173,102 | 12/1992 | Weber et al. | 65/273 |

FOREIGN PATENT DOCUMENTS 1062522  4/1954  France ........................ 432/147

Primary Examiner—Bruce A. Reynolds
Assistant Examiner—John A. Jeffery
Attorney, Agent, or Firm—Brooks & Kushman

[57] ABSTRACT

A roller conveyor furnace (12) for heating flat glass sheets has top and bottom heating arrays (28,30) respectively located above and below the plane of conveyance with each heating array including a plurality of elongated heaters (32,34) extending parallel to the direction of conveyance and spaced laterally from each other with respect to the direction of conveyance. The top heating array (28) has one more heater (32) than the number of heaters (34) of the bottom heating array (30) and the bottom heaters (34) are located in a laterally staggered relationship with respect to the top heaters such that each bottom heater is located laterally between a pair of top heaters. A control (36) energizes the top and bottom heating arrays (28,30) to heat each bottom heater (34) only when the two top heaters 32 on opposite lateral sides thereof are heated to thereby prevent excessive lateral edge heating of the conveyed glass sheet. Each heater (32,34) is also preferably of the electrical resistance type including an electric resistance element (32e,34e) that is energized by the control to provide the heating.

5 Claims, 1 Drawing Sheet

METHOD FOR HEATING A FLAT GLASS SHEET

This is a continuation of copending application Ser. No. 07/942,376, filed on Sep. 9, 1992 now abandoned, which is a continuation application of Ser. No. 07/621,027 filed on Nov. 30, 1990 (now abandoned).

TECHNICAL FIELD

This invention relates to heating of flat glass sheets on a roller conveyor furnace.

BACKGROUND ART

One problem involved with heating of glass sheets is that the edges of the glass sheet tend to become hotter than the center because the edges have a greater surface area for a given square area of the glass sheet surface due to the edge surface that extends between the oppositely facing planar surfaces of the glass sheet. Such edge heating causes warpage of the glass sheet from its planar condition and thereby adversely affects the resultant quality of the glass sheet after subsequent processing. This edge heating problem is present regardless of what type of heating takes place in the furnace whether it is radiant, natural convection, forced convection or any combination of these different types of heating. With roller conveyance of glass sheets, the bottom surface of the glass sheet is also heated by conduction from the conveyor rolls which can also affect the uniformity of the heating.

Prior roller conveyor furnaces for heating flat glass sheets have incorporated heater controls which control the extent of heating along the different lengths of the furnace but have not heretofore addressed the edge heating problem described above.

BRIEF SUMMARY OF THE INVENTION

An object of the present invention is to provide an improved heater control for a roller conveyor furnace for heating flat glass sheets so as to reduce edge heating and thereby provide a more uniformly heated glass sheet.

In carrying out the above and other objects of the invention, a furnace for heating a flat glass sheet is constructed in accordance with the invention to include a housing defining a heating chamber and to also include a roller conveyor located within the housing and having horizontal rolls for conveying a flat glass sheet to be heated through the heating chamber along a horizontal plane of conveyance. Top and bottom heating arrays of the furnace are respectively located above and below the plane of conveyance. Each heating array includes a plurality of elongated heaters extending parallel to the direction of conveyance and spaced laterally from each other with respect to the direction of conveyance, and the top heating array has one more heater than the bottom heating array. The bottom heating array has its heaters located in a laterally staggered relationship with respect to the heaters of the top heating array such that each bottom heater is located laterally with respect to the direction of conveyance between a pair of top heaters. As disclosed, a control of the furnace energizes the top and bottom heating arrays to heat each bottom heater only when the two top heaters on opposite lateral sides thereof are heated to thereby prevent excessive lateral edge heating of the conveyed glass sheet.

In the preferred construction of the furnace, each heater of each heating array is of the electrical resistance type including an electric resistance element that is energized by the control to provide the heating.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
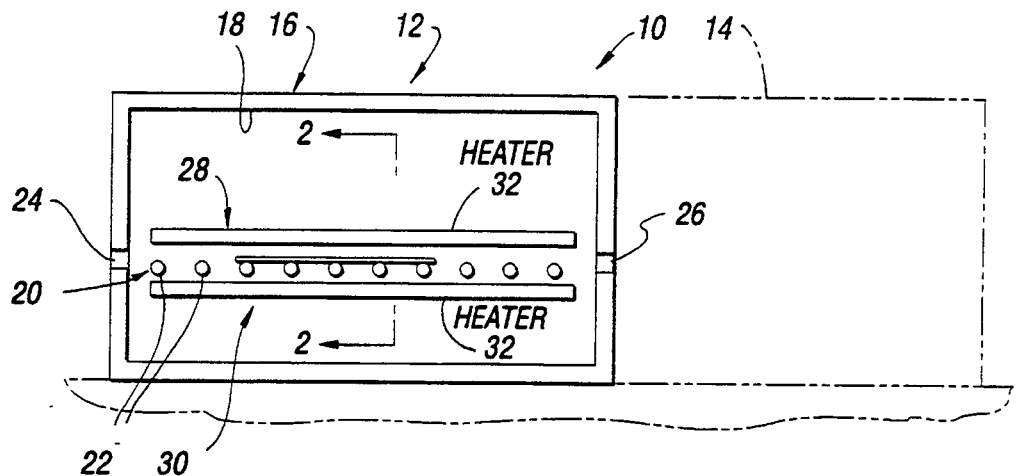
FIG. 1 is a schematic side elevational view of a glass sheet processing system including a roller conveyor furnace constructed in accordance with the present invention to heat flat glass sheets.

With reference to FIG. 1 of the drawings, a flat glass sheet processing system is generally indicated by 10 and includes a furnace 12 that is constructed in accordance with the present invention to heat flat glass sheets as is more fully hereinafter described. System 10 also includes another station 14 for processing the glass sheets such as for bending and tempering or other similar processing.

With continuing reference to FIG. 1, the furnace 12 of this invention includes a housing 16 that defines a heating chamber 18 in which the glass sheet heating takes place. A roller conveyor 20 of the furnace is located within the heating chamber 18 and includes horizontally extending rolls 22 for conveying a flat glass sheet G to be heated through the heating chamber along a horizontal plane of conveyance. These conveyor rolls 32 are preferably made of sinter bonded fused silica particles so as to have good resistance to thermal warpage. Also, furnace housing 16 is sufficiently insulated so as to reduce heat loss from the heating chamber 18 to the environment and has an entrance slot 24 through which glass sheets to be heated are introduced into the furnace as well as having an exit slot 26 through which the heated glass sheets exit the furnace and enter the processing station 14. Suitable doors may also be provided at the entrance and exit slots 24 and 26 to open each slot as a glass sheet is passing therethrough and to thereafter close the slot so as to reduce the heat loss from the furnace.

With combined reference to FIGS. 1 and 2, the furnace 12 also includes top and bottom heating arrays 28 and 30, respectively, located above and below the plane of conveyance at the top surface of the rolls 22 of conveyor 20. Each heating array 28 and 30 includes a plurality of heaters 32 and 34, respectively, spaced laterally from each other with respect to the direction of conveyance. The top heating array 28 has one more heater 32 than the heaters 34 of the bottom heating array 30. Furthermore, the bottom heating array 30 has its heaters 34 located in a laterally staggered relationship with respect to the heaters 32 of the top heating array 28. As such, each bottom heater 34 is located laterally between a pair of top heaters 32.

Figure 2:
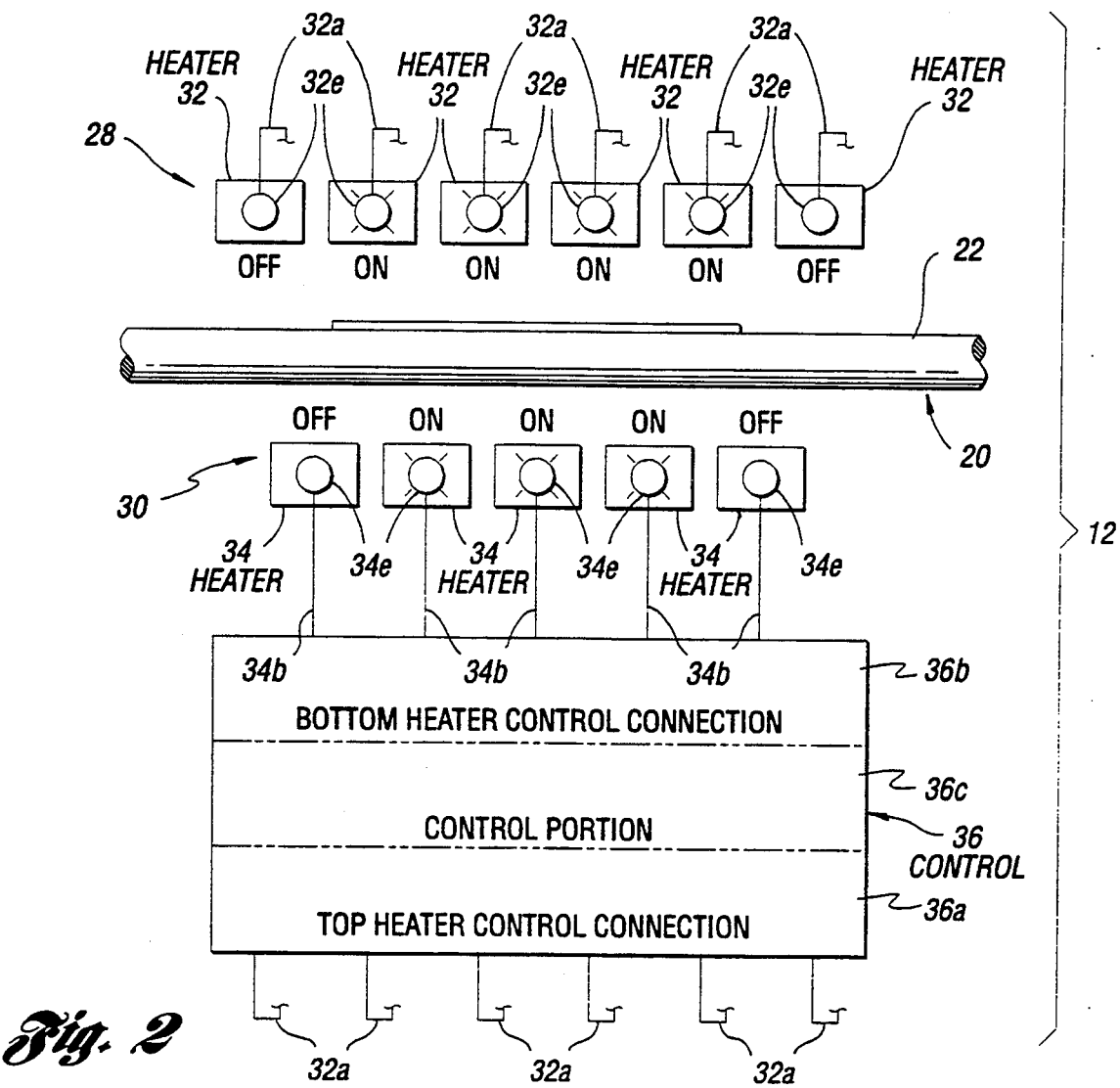
FIG. 2 is a partial cross-sectional view taken through the furnace along line 2—2 of FIG. 1 to illustrate the manner in which heating is performed.

As shown in FIG. 2, a control 36 energizes the top and bottom heating arrays 28 and 30 to heat each bottom heater 34 only when the two top heaters 32 on opposite lateral sides thereof are heated to thereby prevent excessive lateral edge heating of the conveyed glass sheet. Thus, as illustrated, the three central bottom heaters 34 are turned on with the two lateral outboard bottom heaters turned off, and the four central top heaters 32 are turned on with the two lateral outboard top heaters 32 turned off.

Each heater 32 and 34 of the each heating array 28 and 30, respectively, has an elongated shape that extends parallel to the direction of conveyance of the glass sheet on the conveyor rolls 22 of the roller conveyor 20. More specifically, each heater 32 and 34 of each heating array 28 and 30, respectively is preferably of the electrical resistance type including an electric resistance element 32e or 34e that is energized by the control 36 to provide the heating. Connections 32a connect the electric resistance elements 32e of the top heaters 32 with the control 36 at 36a as indicated. Furthermore, connections 34b connect the electric resistance elements 34e of the bottom heaters 34 to the control 36 at 36b. These separate connections of each electric resistance element to the control 36 permit a control portion 36c of the control to selectively control operation of the bottom heaters 34 as previously described so that each bottom heater is only turned on when the two top heaters 32 on each lateral side thereof are also turned on in order to prevent the edge heating problem previously described. A suitable adjuster operates the control to turn the top heaters 32 on or off and thereby also turns the bottom heaters on or off to provide the required extent of heating without excessive lateral edge heating.

While the best mode for carrying out the invention has been described in detail, those familiar with the art to which this invention relates will recognize various alternative designs and embodiments for practicing the invention as defined by the following claims.

What is claimed is:

1. A method for heating a flat glass sheet, comprising:
   conveying a flat glass sheet into a heating chamber of a housing on horizontal rolls of a roller conveyor along a horizontal plane of conveyance between top and bottom heating arrays each of which includes a plurality of heaters spaced laterally from each other with respect to the direction of conveyance with the top heating array having one more heater than the bottom heating array and with the bottom heating array having the heaters thereof located in a laterally staggered relationship with respect to the heaters of the top heating array such that each bottom heater is located laterally between a pair of top heaters; and
   energizing the top and bottom heating arrays to heat each bottom heater only when the two top heaters on opposite lateral sides thereof are heated to thereby prevent excessive lateral edge heating of the conveyed glass sheet.

2. A method for heating a flat glass sheet as in claim 1 wherein the roller conveyor conveys the glass sheet between heating arrays whose heaters each has an elongated shape that extends parallel to the direction of conveyance.

3. A method for heating a flat glass sheet as in claim 1 wherein the roller conveyor conveys the glass sheet between heating arrays whose heaters each is of the electrical resistance type including an electric resistance element that is energized to provide the heating.

4. A method for heating a flat glass sheet as in claim 1 wherein the roller conveyor conveys the glass sheet between heating arrays whose heaters each has an elongated shape and is of the electrical resistance type with each elongated heater extending parallel to the direction of conveyance and with each heater having an electric resistance element that is energized to provide the heating.

5. A method for heating a flat glass sheet, comprising:
   conveying a flat glass sheet into a heating chamber of a housing on horizontal fused silica rolls of a roller conveyor along a horizontal plane of conveyance between top and bottom heating arrays each of which includes a plurality of electrical resistance heaters that have elongated shapes extending parallel to the direction of conveyance and that are spaced laterally from each other with respect to the direction of conveyance with the top heating array having one more heater than the bottom heating array and with the bottom heating array having the heaters thereof located in a laterally staggered relationship with respect to the heaters of the top heating array such that each bottom heater is located laterally between a pair of top heaters; and
   energizing the top and bottom heating arrays to heat each bottom heater only when the two top heaters on opposite lateral sides thereof are heated to thereby prevent excessive lateral edge heating of the conveyed glass sheet.

* * * * *